United States Patent [19]

Nakazawa et al.

[11] Patent Number: 5,499,801
[45] Date of Patent: Mar. 19, 1996

[54] TOOL HOLDING AN ELONGATE PROFILE MATERIAL TO BE SLICED

[75] Inventors: Yasushi Nakazawa; Kiyotaka Touma; Masatoshi Enomoto, all of Tochigi, Japan

[73] Assignees: Honda Giken Kogyo Kabushiki Kaisha, Tokyo; Showa Aluminum Corporation, Osaka, both of Japan

[21] Appl. No.: 284,788

[22] Filed: Aug. 2, 1994

[30] Foreign Application Priority Data

Aug. 4, 1993 [JP] Japan .................................. 5-193636

[51] Int. Cl.⁶ ................................................. B23Q 3/14
[52] U.S. Cl. ...................... 269/48.1; 269/234; 269/157
[58] Field of Search ................................ 279/2.11, 2.12; 414/14, 18; 294/94; 269/48.1, 52, 43, 234, 157; 29/263, 216, 234

[56] References Cited

U.S. PATENT DOCUMENTS 4,518,476  5/1985  Delony et al. ........................... 269/43

Primary Examiner—Robert C. Watson
Attorney, Agent, or Firm—Armstrong, Westerman, Hattori, McLeland & Naughton

[57] ABSTRACT

An end holder (5) has a main recess (8) and cavities (8a) to fit on an end of an extruded aluminum profile material (1) having a semi-hollow portions (1a). Each of chucks (6) can protrude into the semi-hollow portion placed in the cavity (8a) so as to chuck the inner surface of said portion (1a), so that the end of material (1) can be firmly held in place while it is being severed from a body of the material to thereby produce high quality slices of an improved precision in dimension and shape.

4 Claims, 4 Drawing Sheets

TOOL HOLDING AN ELONGATE PROFILE MATERIAL TO BE SLICED

BACKGROUND OF THE INVENTION

1. Field of the Invention

The present invention relates to a tool for holding an elongate profile material that is to be sliced, wherein the material is, for example, made of a metal, such as aluminum.

2. Description of the Prior

Metal profiles, such as aluminum profiles, prepared, for example, by extrusion, have recently been subjected the slicing process to manufacture various parts, for example, of an automobile vehicle.

Generally, a body of each elongate profile has been gripped to leave its end exposed to be severed from the body. A saw has been used to cut the profile's portion located a small distance from the end.

It has however been observed often that the free end undesirably can be moved or slanted towards the saw, just before finish of the sawing. In such an event, the precision in dimension and shape of severed lengths has adversely been affected, accompanied by larger flashes and resulting in a poorer level of quality.

OBJECTS OF THE INVENTION

The present invention was made in view of the problems inherent in the prior art. Therefore an object of the invention is to provide a novel tool for holding an elongate profile material that is being sliced. The tool provided herein is designed such that the accuracy in dimension and shape of the slices is remarkably improved and their flashes are made smaller.

Other objects and advantages will become apparent from preferable embodiments described below. It will be understood that the scope of invention is not delimited to those embodiments given only by way of example, but they may be modified in any manner without deviating from the spirit of the present invention.

SUMMARY OF THE INVENTION

In order to achieve the object, the invention provides a tool for holding an elongate profile material that is being sliced and has at least one longitudinal hollow or semi-hollow portion. The tool essentially comprises an end holder which has a main recess and at least one cavity integral therewith, the main recess and the cavity being designed to fit on and hold an end of the profile material, with the end being severed from a body of the material, and also comprises at least one chuck insertable into the hollow or semi-hollow portion received in the cavity and capable of temporarily chucking the end to be immovable within the recess.

In use of the tool, the end to be severed from the profile material body will fit in the recess and cavity so that the inner surface of the hollow or semi-hollow portion is pressed centrifugally by the chuck. Subsequently, the end will be sliced off the body while being stably held and strongly chucked not to move or slant.

Such a stable position of the material end during each slicing operation makes it possible to manufacture high quality sliced lengths of an improved precision in dimension and shape and having smaller flashes. The end of profile material can firmly be held in place to take the stable position even if considerably thin slices must be severed from the body, thus improving the utility of the slicing apparatus and the slicing process.

Preferably, the chuck comprises: a rigid and split pad composed of segments and capable of being placed in the hollow or semi-hollow portion of the profile material which is temporarily held in the cavity; and an actuating rod to force the segments outwardly in centrifugal direction so as to cause the segments to chuck the end at said hollow or semi-hollow portion. The split pad may be of such a structure that its segments are retained in the pad and reversibly displaceable away from a center of the pad and towards a periphery thereof, or vice versa, due to a means urging them centripetally. Formed centrally of the pad is a wedge-receiving conical bore composed of inner concave regions of the segments and tapered to increase its diameter backwards away from the profile material. The actuating rod may have a front formed as a wedge portion of a conical shape to be located behind the split pad. In operation, the actuating rod will be driven to force its wedge portion into the wedge-receiving bore in the pad, so that the segments thereof are displaced centrifugally against the urging means. Thus, the split pad will chuck or press the inner surface of the hollow or semi-hollow portion towards an inner surface of the cavity.

A drive means such as a pneumatic cylinder may be provided to cause the actuating rod to move in a fore and aft direction.

A drive mechanism may also be provided to move the holder towards and away from the profile material end to be cut.

BRIEF DESCRIPTION OF THE DRAWINGS

Now, embodiments of the present invention will be described referring to the drawings, in which.

THE PREFERRED EMBODIMENTS

Figure 1:
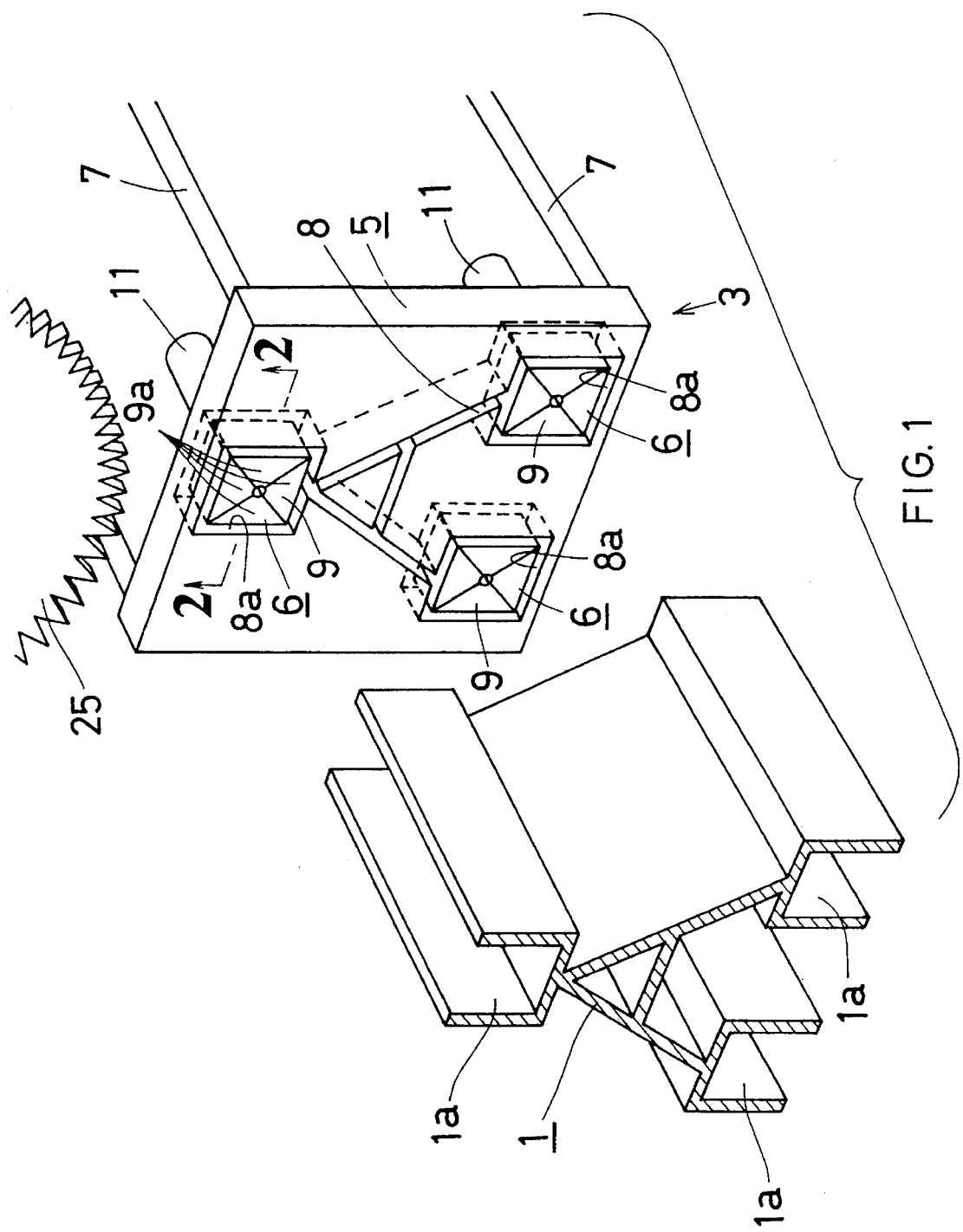
FIG. 1 is a perspective view of a tool for holding an elongate profile material at its end, with the tool being in use and provided in an embodiment.

An embodiment of the invention will now be described referring to the drawings.

Figure 4:
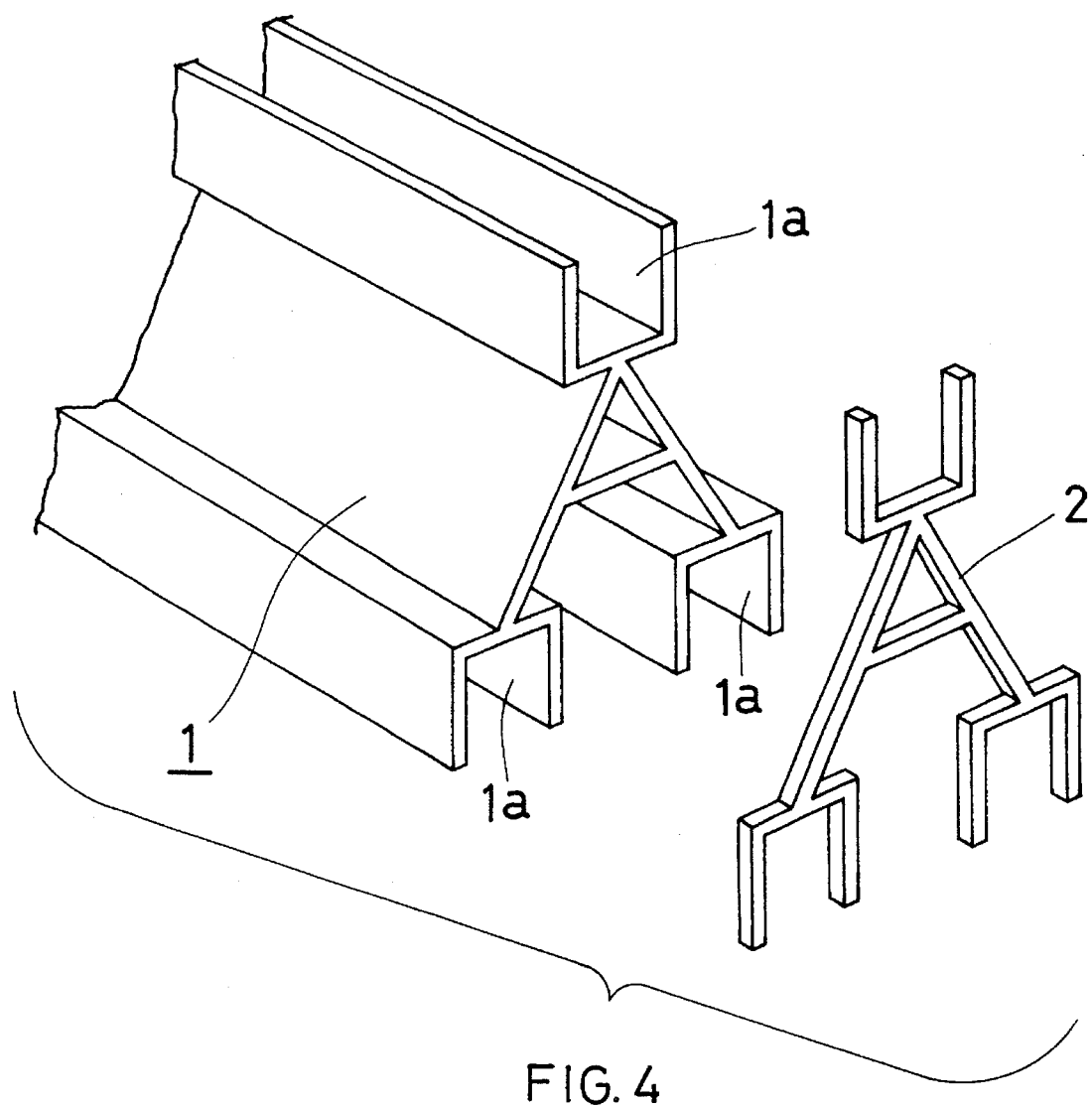
FIG. 4 is a perspective view of the profile material and a slice severed therefrom.

As is shown in FIG. 4, an elongate material to be sliced in this embodiment is an extruded aluminum profile 1. This profile material is generally of an 'A'-shape in cross section, wherein its summit and feet continue to, and are integral with, bottoms of U-channels formed as semi-hollow portions 1a. Thin slices 2 of a predetermined thickness have to be severed repeatedly from an end of the elongate profile material 1.

A tool as shown in FIG. 1 is used to hold the end of the material 1 in this embodiment. This tool 3 comprises an end holder 5, chucks 6 and a drive mechanism 7 for moving the holder.

The end holder 5 is of a size larger than a contour of the profile material 1. A main recess 8 generally 'A'-shaped corresponding to the cross section of said material 1 is formed in a front surface of the end holder 5 so as to tightly receive the end. The recess B is formed as shallow as possible, insofar as the chucks 6 can operate fully in a manner described below, so that the thin slices from said material can be of a desired small thickness.

Each chuck 6 comprises a split pad 9, an actuating rod 10 for operating the pad, and a drive means 11 for moving the rod.

The split pad 9, square as a whole and quartered by diagonal lines, is disposed in each of cavities 8a integral with a summit and feet of the 'A'-shaped main recess 8 in the end holder 5. Those cavities 8a are shaped to respectively receive the semi-hollow portions of the profile material.

Figure 2:
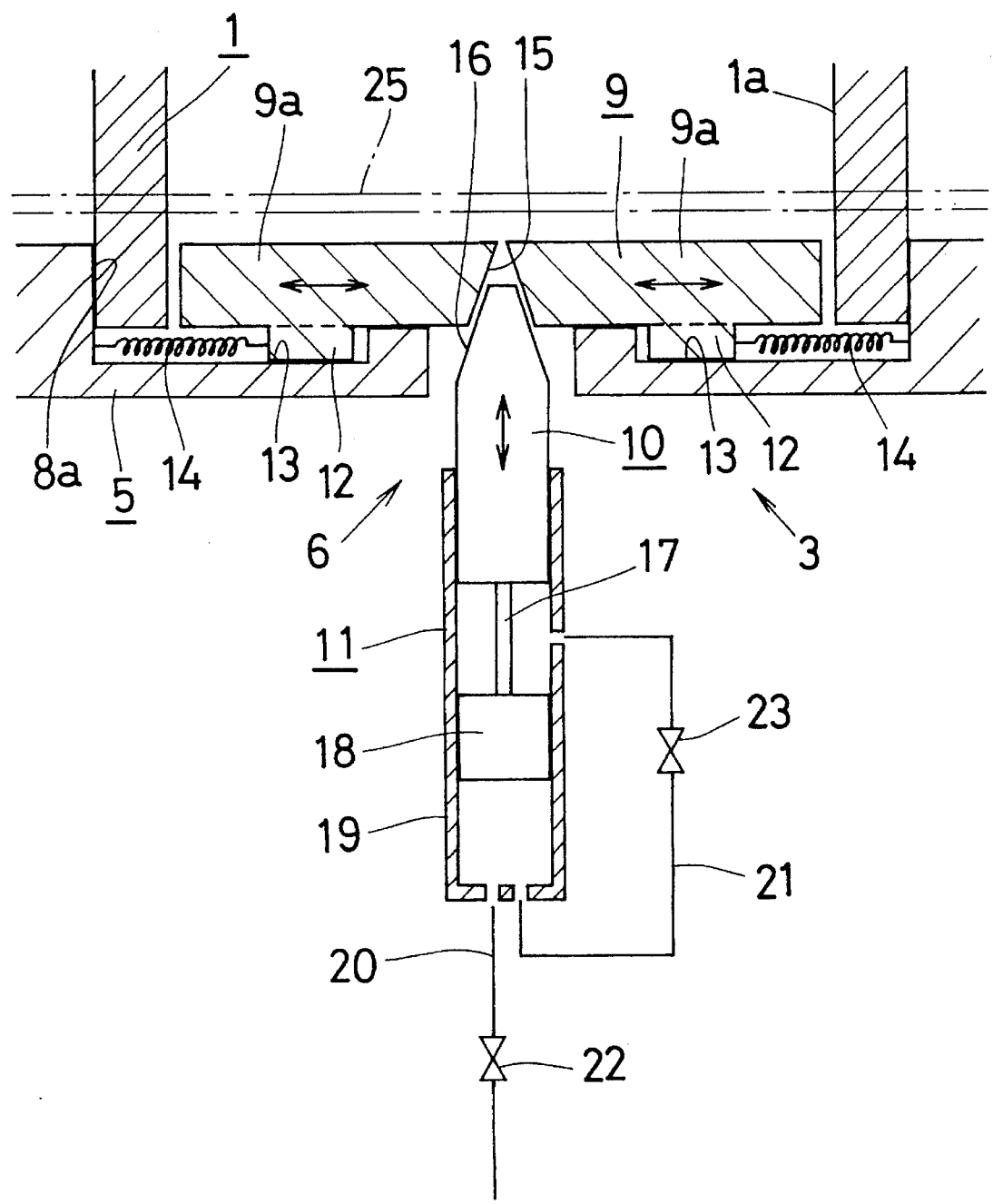
FIG. 2 is a cross section taken along the line 2—2 in FIG. 1, with a wedge portion being in an unactuated position.

Each of segments 9a of the split pad 9 has a guide lug 12, integral with a back surface of the segment as shown in FIG. 2. Guide grooves 13 formed in a bottom of each cavity 8a slidably hold the guide lugs 12, so that the segments can move towards and away from each other. A spring 14 always urges each segment 9a towards a center of the split pad. With the pad segments being gathered by the springs centrally of the cavity 8a, there will be provided a clearance between an outer periphery of the pad 9 and an inner periphery of the cavity. Such a clearance is of a desired width larger than the wall thickness of the semi-hollow portions 1a of material 1.

Formed centrally of each split pad 9 is a wedge-receiving bore 15 of a conical shape in cross section and composed of inner concave regions of the four segments 9a. This bore is tapered to increase its diameter backwards away from the profile material.

The actuating rod 10 has a front formed as a wedge portion 16 also of a conical shape, and is located behind the split pad 9. In operation, the actuating rod 10 will be driven to force its wedge portion 16 into the wedge-receiving bore 15 in the pad, so that the segments 9a thereof are displaced centrifugally, overcoming the urging means. Thus, the split pad 9 will chuck each semi-hollow portion of the material 1 between the outer surface of the pad 9 and the inner surface of the cavity 8a.

The drive means 11 for the actuating rod is a pneumatic driver. This driver comprises a piston 18 connected by a stem 17 to a basal end of the actuating rod 10, and an outer cylinder 19 accommodating the piston 18 and the basal end of said rod. A compressed air inlet tube 20 is attached to a rear end of the cylinder. A by-pass communication tube 21 is connected to spaces, with one of them being located in front of and the other in rear of the piston 18. Electromagnetic valves 22 and 23 are disposed in the inlet tube 20 and communication tube 21, respectively.

The drive mechanism 7 for driving the end holder 5 fore and aft are also pneumatic or the like cylinders connected to four rear corners of the holder.

Figure 3:
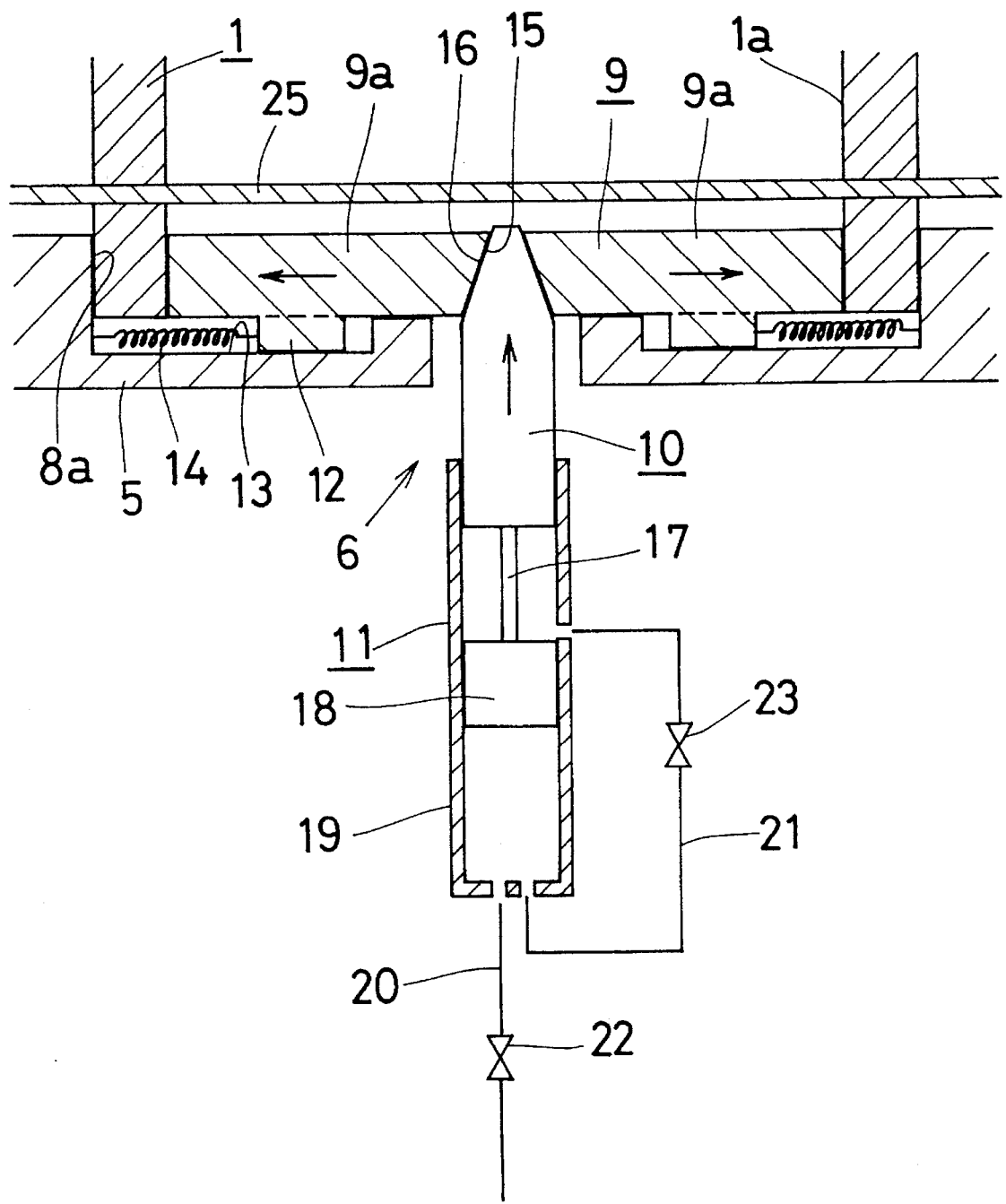
FIG. 3 is similarly a cross section taken along the line 2—2, but with the wedge portion being in its actuated position.

In operation, the slicing of the profile material 1 will be carried out in a manner shown in FIG. 2. An end to be severed will be caused at first to project a distance ahead of the position where a cutting saw 25 is located. This distance corresponds to a predetermined thickness of the slices. The projected end of the material 1 thus fits in the main recess 8 and the cavities formed in the holder 5. Then, one of the electro-magnetic valve 22 will be opened, with the other 23 being closed, so that the actuating rod 10 moves forward as shown in FIG. 3. As a result, the segments 9a of each split pad 9 will be displaced centrifugally of the center thereof, thereby firmly chucking the inner periphery of each semi-hollow portion 1a of the end of profile material 1. Thereafter, the saw 25 will be driven to slice this end off the body of said material.

It will be apparent that during the slicing operation the tool 3 continues to firmly hold the material 1 at its end not to undesirably rock or slant, so that high quality slices 2 of an improved precision in dimension and shape and having smaller flashes or no flashes are produced.

Upon severing the slice, the drive mechanism 7 will retract the end holder 5. After retraction of this holder, one of the electromagnetic valves 22 is closed and the other 23 is opened so that the actuating rod 10 is also retracted. The springs 14 cause the segments 9a of each split pad 9 to return to their centripetal position, thereby enabling withdrawal of the severed slice 2 out of the holder 5. These operations will be repeated until a desired number of slices are produced.

In summary, the tool 3 proposed herein is effective to firmly seize an end of an elongate profile material 1 while the end is being sawn. Further, the tool can be controlled to take any desired position within a very small tolerance along the material 1 and adjacent to its end which is being sliced. Thus, the slicing operation can now be done precisely, smoothly and in a so reliable manner that it can be automated to save labor in the process producing the slices of an improved dimensional quality.

What is claimed is:

1. A tool for holding a longitudinal end of an elongate profile material, said profile material having a body and at least one hollow or semi-hollow portion positioned longitudinally along said body, the tool comprising:

an end holder having a main recess and at least one cavity integral therewith;

the main recess and the at least one cavity being designed to fit on and hold the end of said body and a hollow or semi-hollow portion, respectively, of the profile material for severance of a projecting portion thereof;

a chucking device having at least one chucking segment insertable into the hollow or semi-hollow portion received in the cavity;

means for normally biasing said at least one chucking segment to a release condition with respect to said received portion of said profile material in said cavity, and means for activating said at least one chucking segment against said biasing means for engaging said received portion of said profile material and temporarily chucking said profile material with respect to said recess.

2. A tool for holding an elongate profile material that is being sliced and has at least one longitudinal hollow or semi-hollow portion, the tool comprising:

an end holder which has a main recess and at least one cavity integral therewith;

the main recess and the cavity being designed to fit on and hold an end of the profile material, with the end being severed from a body of the material; and at least one chucking device insertable into the hollow or semi-hollow portion received in the cavity and capable of temporarily chucking the end to be immovable within the recess, wherein the chucking device comprises:

a rigid and split pad composed of segments and capable of being placed in the hollow or semi-hollow portion of the profile material which is temporarily held in the cavity; and an actuating rod to force the segments outwardly in centrifugal direction so as to cause the segments to chuck the end at said portion, wherein the segments are retained in the pad and reversibly displaceable away from a center of the pad and towards a periphery thereof, or vice versa, against or due to a means centripetally urging the segments, a wedge-receiving bore of a conical shape and composed of inner concave regions of the segments and tapered to increase its diameter backwards away from the profile material is formed through the split pad, and a wedge portion of a conical shape corresponding to the bore and formed as a front end of the actuating rod, with the wedge portion usually being located behind the split pad and displaceable fore and aft, whereby in operation the actuating rod can be driven to force its wedge portion into the wedge-receiving bore in the pad, so that the segments thereof are displaced centrifugally against the urging means, and thus the split pad chucks the inner surface of the hollow or semi-hollow portion.

3. A tool as defined in claim 2, further comprising a drive means to cause the actuating rod to move in a fore and aft direction, wherein the drive means is a pneumatic cylinder.

4. A tool as defined in claim 1, wherein said end holder is movable and further comprising a drive mechanism to move the end holder towards and away from the profile material end to be cut.

* * * * *